United States Patent
Roethling et al.

(10) Patent No.: US 12,116,252 B2
(45) Date of Patent: Oct. 15, 2024

(54) METHOD FOR SENSING INFORMATION CONCERNING THE EXTENT OF A PRODUCT CARRIER ON A GUIDED VEHICLE THAT CAN BE OPERATED IN AN AT LEAST PARTIALLY AUTOMATED MANNER

(71) Applicant: Robert Bosch GmbH, Stuttgart (DE)

(72) Inventors: Frank Roethling, Stuttgart (DE); Patrick Strouhal, Murrhardt (DE)

(73) Assignee: Robert Bosch GmbH, Stuttgart (DE)

( * ) Notice: Subject to any disclaimer, the term of this patent is extended or adjusted under 35 U.S.C. 154(b) by 467 days.

(21) Appl. No.: 17/498,972

(22) Filed: Oct. 12, 2021

(65) Prior Publication Data

US 2022/0112056 A1 Apr. 14, 2022

(30) Foreign Application Priority Data

Oct. 14, 2020 (DE) ..................... 10 2020 212 971.1

(51) Int. Cl.
*B66F 9/06* (2006.01)
*B66F 9/075* (2006.01)
*G05D 1/00* (2024.01)

(52) U.S. Cl.
CPC ............ *B66F 9/063* (2013.01); *B66F 9/0755* (2013.01); *G05D 1/0214* (2013.01); *G05D 1/0248* (2013.01)

(58) Field of Classification Search
CPC ..... B66F 9/063; B66F 9/0755; G05D 1/0214; G05D 1/0248
See application file for complete search history.

(56) References Cited

U.S. PATENT DOCUMENTS

| | | | |
|---|---|---|---|
| 2017/0349197 A1 | 12/2017 | Jonasson et al. | |
| 2020/0002143 A1* | 1/2020 | Hasegawa | B66F 9/07559 |
| 2020/0299117 A1* | 9/2020 | Sperlich | B66F 9/0755 |

FOREIGN PATENT DOCUMENTS

| | | | | |
|---|---|---|---|---|
| DE | 10 2019 107 096 A1 | 10/2020 | | |
| EP | 2385014 A1 * | 11/2011 | | B66F 9/0755 |

(Continued)

OTHER PUBLICATIONS

EP 2385014A1—translation (Year: 2010).*

(Continued)

*Primary Examiner* — Ian Jen
*Assistant Examiner* — Renee LaRose
(74) *Attorney, Agent, or Firm* — Maginot, Moore & Beck LLP

(57) ABSTRACT

The disclosure relates to a method for sensing information concerning the extent of a product carrier, which can be transported by means of a guided vehicle that can be operated in an at least partially automated manner, in at least one direction of extent, in which at least the following steps are carried out in an automated manner by the guided vehicle: a) driving to an initial position, predefined in relation to the product carrier, the reaching of the initial position being detected by means of a sensor device of the guided vehicle, b) driving a predefined distance along the direction of extent, starting from the initial position, c) carrying out a further detection operation by means of the same sensor device of the guided vehicle once the predefined distance has been driven.

11 Claims, 4 Drawing Sheets

(56) References Cited

FOREIGN PATENT DOCUMENTS

EP 3 251 918 A1 12/2017
EP 3 369 696 A1 9/2018

OTHER PUBLICATIONS

"Safety of industrial trucks—Driverless trucks and their systems," DIN EN 1525, Sep. 1997, European Committee for Standardization (21 pages).

\* cited by examiner

METHOD FOR SENSING INFORMATION CONCERNING THE EXTENT OF A PRODUCT CARRIER ON A GUIDED VEHICLE THAT CAN BE OPERATED IN AN AT LEAST PARTIALLY AUTOMATED MANNER

This application claims priority under 35 U.S.C. § 119 to application no. DE 10 2020 212 971.1, filed on Oct. 14, 2020 in Germany, the disclosure of which is incorporated herein by reference in its entirety.

TECHNICAL FIELD

The disclosure relates to a method for sensing information concerning the extent of a product carrier, which can be transported by means of a guided vehicle that can be operated in an at least partially automated manner, in at least one direction of extent. Furthermore, a computer program, a machine-readable storage medium, a control unit, a system, a guided vehicle and a use are also specified. The disclosure may be used in particular for the most reliable possible and automatic differentiation between 400 and 600 dollies (product carriers) when such a product carrier is to be loaded or is being loaded onto a guided vehicle.

BACKGROUND

Guided vehicles that can be operated in an at least partially automated manner or even operated autonomously are known, and can also be referred to generally as (automated or autonomous) guided vehicles (Automated Guided Vehicles; AGVs for short). Corresponding guided vehicles are defined for example in EN 1525. In order to be able to realize the most reliable possible transport, the transported product, which is usually stored in a product carrier (often also referred to in the area concerned as a "dolly") should be transported as close as possible to the center of gravity of the guided vehicle.

In the case of guided vehicles with an elevated front superstructure (in relation to the loading area or loading platform), the product carrier is usually to be loaded in such a way that its front end face is arranged (as far as possible in a form-fitting manner) against or at least as closely as possible against the rear side or the rearward end face of the front superstructure or adjoins the latter, whereby tipping forward and/or damaging the load (the transported product in the product carrier) in the event of an emergency stop and/or abrupt braking operation in the driving direction is to be prevented as far as possible.

Therefore, for automated operation, which generally also comprises automated loading operations, sensors in or on the guided vehicle are advantageous, serving the purpose of monitoring the correct positioning of the product carrier on the loading platform. Often used in this connection are at least two loading platform sensors spaced apart from one another in the longitudinal direction. This describes sensors that are arranged in and/or on the loading platform for sensing the positioning of the product carrier on the loading platform. Corresponding sensors are important in particular for mixed operation, in which product carriers of different lengths are to be loaded and transported one after the other in an automated manner by a guided vehicle. In particular for mixed operation, it has been assumed up until now that the use of at least two loading platform sensors spaced apart from one another in the longitudinal direction, one of which is responsible for the correct mounting on the loading platform and the other is responsible for detecting the length of the product carrier, is indispensable.

In addition, safety sensors are generally also arranged in and/or on the guided vehicle, serving for monitoring the area around the guided vehicle. Sensors for monitoring at least one warning zone and/or protective zone in the surrounding area of the guided vehicle may be used for example for this purpose. If an object, such as for instance a person, or part thereof in a warning zone or protective zone is sensed by a safety sensor, the guided vehicle has usually come too close to this object, so that generally operation of the guided vehicle is influenced, in particular in a way corresponding to the zone or the type of zone in which the object has been sensed, to avoid a collision with the object as far as possible.

In the case of guided vehicles with which mixed operation is intended to be possible with the highest possible operational safety, there is consequently the disadvantage that they generally have to be equipped with a multiplicity of different sensors. This has a disadvantageous effect in particular on the material costs for such guided vehicles. Furthermore, the many different sensors may also have a disadvantageous effect on the stockkeeping costs for spare parts for corresponding guided vehicles. Moreover, the many sensors may also have a disadvantageous effect on the operating times of the guided vehicles, since, with the number of sensors used, the risk of failure often also increases.

SUMMARY

Against this background, the disclosure is based on the object of at least partially overcoming the disadvantages or solving the problems described in connection with the prior art. In particular, in the case of a guided vehicle that can be operated in an at least partially automated manner, which is intended in particular also to be suitable for mixed operation, the number of sensors used is to be reduced while nevertheless providing the highest possible operational safety.

These objects are achieved by the features of the disclosure. Advantageous configurations become apparent from the embodiments.

Contributing to this is a method for sensing information concerning the extent of a product carrier, which can be transported by means of a guided vehicle that can be operated in an at least partially automated manner, in at least one direction of extent, in which at least the following steps are carried out in an automated manner by the guided vehicle:

a) driving to an initial position, predefined in relation to the product carrier, the reaching of the initial position being detected by means of a sensor device of the guided vehicle, b) driving a predefined distance along the direction of extent, starting from the initial position, c) carrying out a further detection operation by means of the same sensor device of the guided vehicle once the predefined distance has been driven.

Steps a), b) and c) can be carried out at least once and/or repeatedly in the specified sequence to carry out the method. The method may be carried out for example by means of a control unit, also described here, and/or a system, also described here, and/or a guided vehicle, also described here. In the method, at least steps a), b) and c) may be advantageously carried out autonomously by the guided vehicle.

The method contributes in an advantageous way to being able to dispense with at least one (inductive) sensor for detecting the length of the product carrier. For this purpose, for the first time a method by which a detection of the length of the product carrier is made possible by means of an existing safety sensor as a sensor device is specified.

The guided vehicle may be for example such a guided vehicle as defined in EN 1525. The guided vehicle may be designed for at least partially automated and/or autonomous (driving) operation. The guided vehicle generally has a loading platform. Furthermore, the guided vehicle may have a front superstructure. The front superstructure generally has toward the loading platform a substantially vertical rear wall. In the region in which the loading platform adjoins the rear wall or ends at it, a loading platform sensor of the guided vehicle may be arranged. The loading platform sensor usually serves for detecting the correct mounting of the product carrier on the loading platform. The loading platform sensor may be for example an inductive sensor.

The sensor device may be arranged rearwardly on the guided vehicle and/or in the region of the rear end of the loading platform. The sensor device is preferably designed for the purpose of monitoring at least one warning zone and/or at least one protective zone in the surrounding area of the guided vehicle, in particular behind the guided vehicle, or at least scanning it for this purpose, for example by means of laser beams. The sensor device may (also) represent a safety sensor of the guided vehicle or perform the functions thereof. The sensor device may preferably be configured as a laser scanner or comprise such a laser scanner. The sensor device is generally aligned predominantly toward the rear or toward the rear and to the sides (to the left side and right side of the guided vehicle). It may in this case be provided that the sensor device is not aligned upwardly. In particular, the guided vehicle may be configured here by way of example without a rear loading platform sensor and/or such a sensor may not be used in the sensing according to the method described here.

The product carrier may be for example a rolling carriage, in and/or on which transported products can be stored, in particular for transport. The product carrier may be equipped with at least two front wheels, spaced apart in the lateral direction, and with at least two rear wheels, spaced apart in the lateral direction. The lateral distance between these wheels may for example be dimensioned in each case in such a way that the product carrier can be driven under by the guided vehicle in such a way that the product carrier can be loaded on a loading platform of the guided vehicle (by being driven under). Corresponding product carriers may also be referred to generally as "dollies". The front wheels and the rear wheels generally also have, depending on the length of the product carrier, a specific distance from one another in the longitudinal direction. Consequently, the front wheels and the rear wheels may serve here as particularly advantageous means of identification for the length of the product carrier. Alternatively or additionally, (other) means of identification, which can be sensed by the sensor device, may be provided on the product carrier, spaced apart from one another by a specific distance in the longitudinal direction. For example, in this connection there may be at least one front means of identification and at least one rear means of identification. The longitudinal distance between the front means of identification and the rear means of identification may advantageously be characteristic of the type of the product carrier and/or the length of the product carrier.

The direction of extent may be for example the longitudinal direction. The extent of the product carrier may concern in particular the length of the product carrier. Information concerning the extent of the product carrier may be for example the length of the product carrier directly or information that allows a conclusion to be drawn as to the length of the product carrier. The information may for example be characteristic of a specific type of product carrier. As a result, the method can advantageously also contribute to a differentiation as to which type of product carrier (from a defined number of types of product carriers) is being loaded onto the guided vehicle. Particularly advantageously, the method may be used for differentiation between the two types, a 400 dolly (400 mm long product carrier) and a 600 dolly (600 mm long product carrier).

In step a), driving to an initial position, predefined in relation to the product carrier, takes place, the reaching of the initial position being detected by means of a sensor device of the guided vehicle. The initial position may be predefined for example in such a way in relation to the product carrier that here it is the position in which at least one front means of identification of the product carrier, such as for instance at least one front wheel of the product carrier lies (at the time or for the first time) in a warning zone monitored by means of the sensor device. Preferably, it may be provided that here both front wheels of the product carrier (must) lie in one warning zone each (of two warning zones). These (two) warning zones may for example be placed at an end of a protective zone that is remote from the guided vehicle or the rear end, which is (likewise) being monitored by means of the sensor device. The protective zone generally serves in this case for the purpose of changing or even stopping further movement if an object is detected in the protective zone. This means in other words in particular that the protective zone represents a "harder" boundary for the operations of the guided vehicle in comparison with the warning zone.

In step b), driving a predefined distance along the direction of extent takes place, starting from the initial position. The distance is in this case generally predefined such that it is suitable for being able to differentiate from one another at least two different types of product carriers that differ from one another in their extent along the direction of extent, in particular in their length. To be able to drive the distance (unhindered), it may possibly be advantageous first to switch over or change the protective zone in order to be able to drive under the product carrier (in the first place). In particular, the protective zone may be made narrower here (in the lateral direction), so that the wheels of the product carrier do not lie in the protective zone (while driving under the product carrier). When switching over the protective zone, the warning zones may possibly come closer to the guided vehicle. A difference in distance that possibly has to be taken into account may be included in the pre-definition of the distance, or be taken into account in it.

In step c), carrying out a further detection operation by means of the same sensor device of the guided vehicle takes place once the predefined distance has been driven. In particular, the distance is predefined such that, in the case of a first (shorter) one of the at least two types of product carriers, in the detection operation according to step c) at least one rear means of identification of the product carrier, such as for instance at least one rear wheel of the product carrier, lies (at the time or for the first time) in the warning zone monitored by means of the sensor device. Preferably, it may be provided that here both rear wheels of the product carrier (must) lie in one warning zone each (of the two warning zones). Accordingly, when driving under a second (longer) one of the at least two types of product carriers, in the detection operation according to step c) no means of identification of the product carrier, in particular no (rear)

wheel of the product carrier, would lie in the warning zone monitored by means of the sensor device.

In a step d), an evaluation of the detection operation from step c) may take place, in particular in order to determine in dependence on the detection result from step c) which type of product carrier (from at least two types of product carriers) is being driven under or loaded at the time. In this case it may be determined for example that a first (shorter) one of the at least two types of product carriers is being driven under or loaded at the time if the at least one rear means of identification is detected after driving the predefined distance. Furthermore, it may by way of example be determined that a second (longer) one of the at least two types of product carriers is being driven under or loaded at the time if no rear means of identification is detected after driving the predefined distance. Alternatively or additionally, after step c) the states of the warning zones may be stored as information for the further loading and unloading operations.

According to an advantageous configuration, it is proposed that steps a) to c) are carried out during a loading of the product carrier onto the guided vehicle. For the loading of the product carrier onto the guided vehicle or onto a loading platform of the guided vehicle, the product carrier may for example be driven under by at least part of the guided vehicle, such as for instance the longitudinal portion of the guided vehicle with the loading platform. This can contribute in an advantageous way to being able to detect different types of product carriers (different lengths) (directly) when loading the product carrier onto the guided vehicle.

According to a further advantageous configuration, it is proposed that at least one warning zone in the surrounding area of the guided vehicle is monitored by means of the sensor device. Preferably, the sensor device monitors at least two warning zones behind the or on the rear side of the guiding vehicle. Furthermore, at least one protective zone in the surrounding area of the guided vehicle may be monitored by means of the sensor device. In particular, a rearward laser scanner that is (otherwise) provided for personal protection can (consequently) be used as a sensor device to make possible the sensing of the information concerning the extent (length) of the product carrier, and possibly thereby a differentiation between at least two types of product carriers (different lengths), by way of additional warning zones that are switched, and possibly evaluated, at the same time as the (personal) protective zone.

According to a further advantageous configuration, it is proposed that the sensor device scans the at least one warning zone by means of laser beams. In this connection, the sensor device may for example be configured as a laser scanner. In particular, it is a laser scanner which is (otherwise) also used for monitoring at least one (personal) protective zone in the surrounding area of the guided vehicle, in particular behind the guided vehicle.

According to a further aspect, a computer program for carrying out a method described here is proposed. In other words, this relates in particular to a computer program (product), comprising commands, which during execution of the program by a computer, cause the latter to perform a method described here.

According to a further aspect, a machine-readable storage medium, on which the computer program is stored, is proposed. The machine-readable storage medium is often a computer-readable data carrier.

According to a further aspect, a control unit for a guided vehicle that can be operated in an at least partially automated manner is also proposed, the control unit being designed for carrying out a method described here. The control unit (controller) may for example comprise a computer which can execute commands in order to perform the method. For this purpose, the computer or the control unit may for example execute the specified computer program. For example, the computer or the control unit may access the specified storage medium in order to be able to execute the computer program.

According to a further aspect, a system for a guided vehicle that can be operated in an at least partially automated manner is also proposed, the system comprising at least the control unit and a sensor device, which can be connected to the control unit for data transmission. The sensor device is generally the sensor device that is used in the method.

According to a further aspect, a guided vehicle that can be operated in an at least partially automated manner is also proposed. Alternatively or additionally, this may also be described as a guided vehicle that can be operated in an at least partially automated manner which is designed for carrying out a method described here. The guided vehicle is in addition generally designed for at least partially automated or autonomous (driving) operation.

According to a further aspect, a use of a laser scanner attached to the rear side of a guided vehicle that can be operated in an at least partially automated manner is proposed for the automated sensing of information concerning the extent of a product carrier, which is intended to be transported by means of the guided vehicle, in at least one direction of extent.

To sum up, a particularly advantageous configuration of the solution described here can in other words also be described in particular (and possibly alternatively) by saying that, when loading dollies onto an autonomous transporting vehicle, different types of dollies (different lengths) are to be detected. Advantageously used for this purpose is a method in which, with the aid of a laser scanner attached to the rear side of the vehicle, the wheels of the dollies are detected with the aid of warning zones. Once the front wheels have been detected and the vehicle has driven a predetermined distance under the dolly, the length of the dolly is determined by at least a second interrogation of the warning zones.

The details, features and advantageous configurations discussed in connection with the method may also arise correspondingly in the case of the computer program and/or the storage medium and/or the control unit and/or the system and/or the guided vehicle and/or the use presented here, and vice versa. To this extent, for more detailed characterization of the features, reference is made in full to the statements made there.

BRIEF DESCRIPTION OF THE DRAWINGS

The solution presented here and its technical context will be explained in more detail below on the basis of the figures. It is pointed out that the disclosure is not intended to be restricted by the exemplary embodiments shown. In particular, unless explicitly stated otherwise, it is also possible to extract partial aspects of the substantive matter explained in the figures and to combine them with other constituent parts and/or findings from other figures and/or from the present description. In the figures, by way of example and schematically.

DETAILED DESCRIPTION

Figure 1:
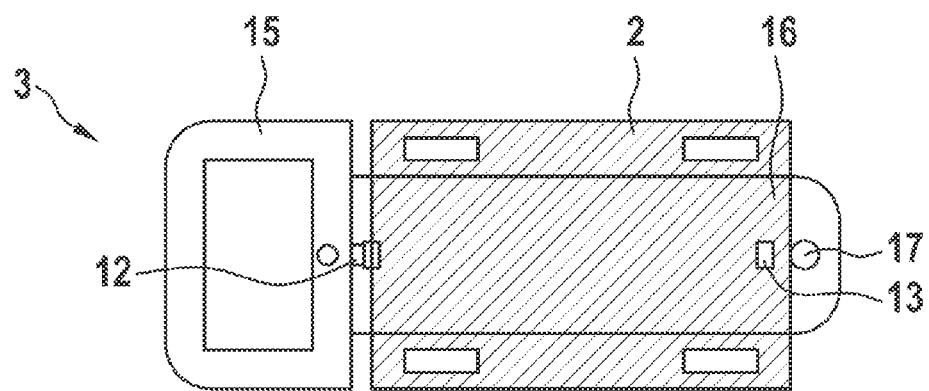
FIG. 1 shows two guided vehicles according to the prior art in plan view.

FIG. 1 shows by way of example and schematically two guided vehicles 3 according to the prior art in plan view. The guided vehicles 3 have in each case a front superstructure 15 and a loading platform 16. On the upper of the two guided vehicles 3, a product carrier 2 with a length of 600 mm (a so-called 600 dolly) with stable loading is loaded on the rear side of the front superstructure 15. On the lower of the two guided vehicles 3, a product carrier 2 with a length of 400 mm (a so-called 400 dolly) with stable loading is loaded on the rear side of the front superstructure 15.

The guided vehicles 3 also have in each case two loading platform sensors 12, 13 and at least one safety sensor 17. The front loading platform sensor 12 serves for detecting the correct mounting of the product carrier 2 on the loading platform 16. The rear loading platform sensor 13 serves for detecting the length of the product carrier. The two loading platform sensors 12, 13 are usually in each case an inductive sensor. Consequently, the "detection" of the length of the product carrier according to the prior art is generally confined to detecting whether or not, with a product carrier 2 that is loaded up to the front superstructure 15 and consequently can be detected in the region of the front loading platform sensor 12, a product carrier detection also takes place at the rear loading platform sensor 13. It is however sufficiently possible in this way to differentiate whether a shorter product carrier 2 (here a 400 dolly), which stretches only partially over the loading platform 16, has been loaded, or a longer product carrier 2 (here a 600 dolly), which stretches at least completely over the loading platform, has been loaded.

The method described here allows it to be possible in an advantageous way to dispense with at least the rear loading platform sensor 13.

Figure 2:
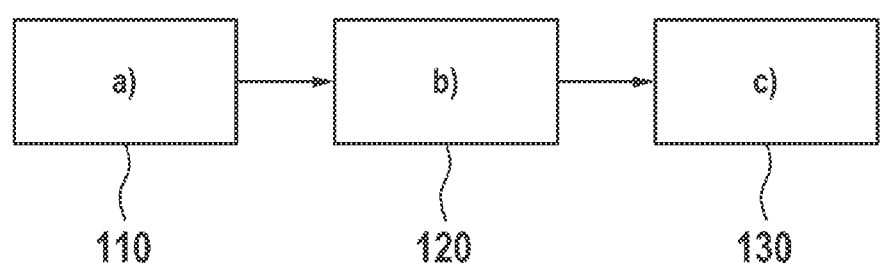
FIG. 2 shows an exemplary sequence of the method proposed here.

FIG. 2 schematically shows an exemplary sequence of the method presented here. The method serves for sensing information concerning the extent 1 of a product carrier 2, which can be transported by means of a guided vehicle 3 that can be operated in an at least partially automated manner, in at least one direction of extent 4 (cf. FIGS. 3 to 7). The sequence of steps a), b) and c) represented by the blocks 110, 120 and 130 is given by way of example and can for example be run through at least once in the sequence shown to carry out the method.

Figure 4:
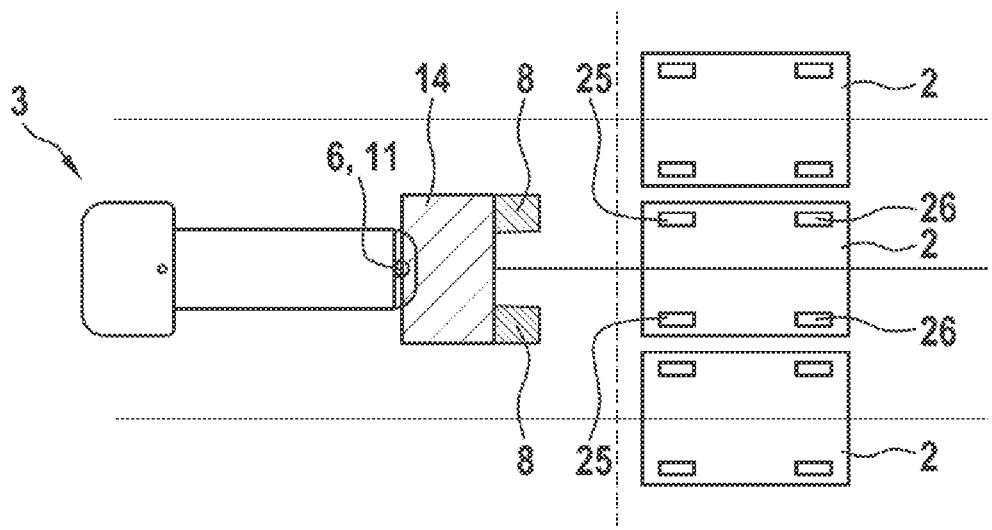
FIGS. 4-7 show an advantageous use of the method described here in plan view.
Figure 5:
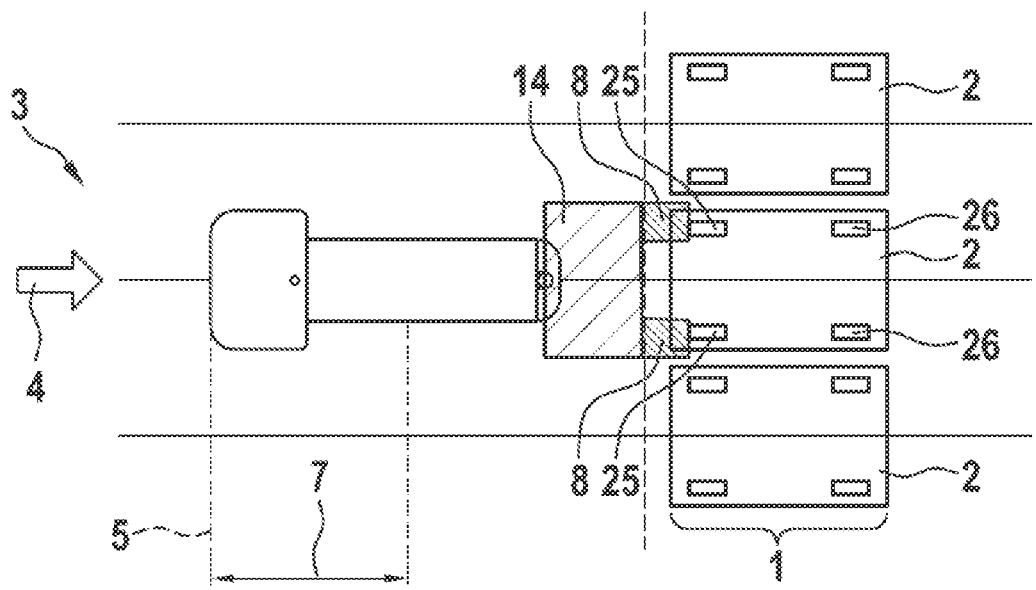

In block 110, driving to an initial position 5, predefined in relation to the product carrier 2, takes place according to step a), the reaching of the initial position 5 being detected by means of a sensor device 6 of the guided vehicle 3 (cf. FIGS. 4 and 5). In block 120, driving a predefined distance 7 along the direction of extent 4, starting from the initial position 5 (cf. FIGS. 5 and 6), takes place according to step b). In block 130, carrying out a further detection operation by means of the same sensor device 6 of the guided vehicle 3 once the predefined distance 7 has been driven (cf. FIGS. 6 and 7) takes place according to step c).

Figure 3:
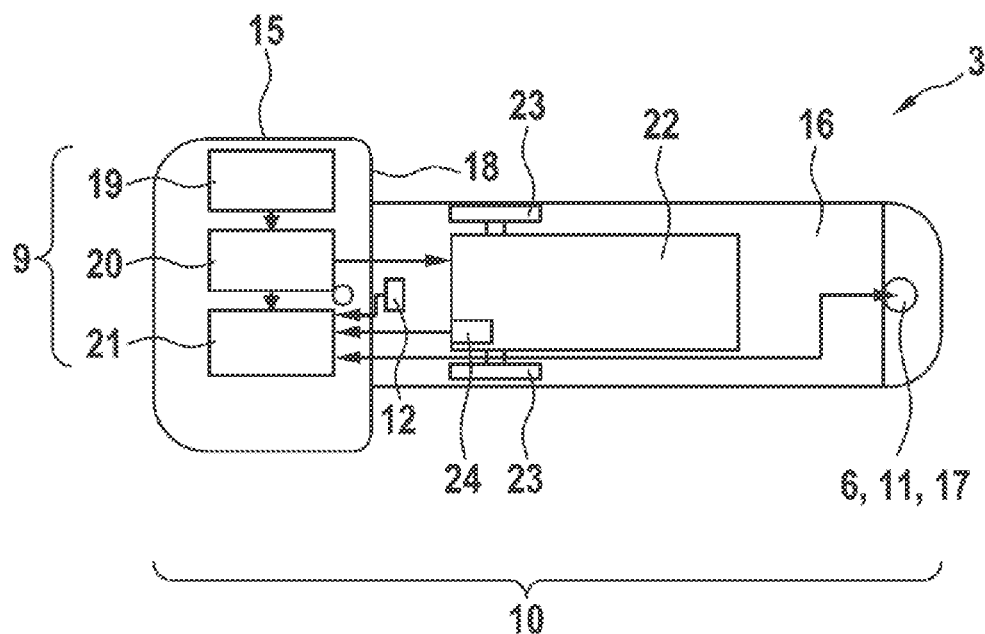
FIG. 3 shows an embodiment of a guided vehicle described here in a sectional representation.

FIG. 3 shows by way of example and schematically an embodiment of a guided vehicle 3 described here in a sectional representation. The guided vehicle 3 is designed for at least partially automated or autonomous (driving) operation. Furthermore, the guided vehicle 3 is designed for carrying out a method described here. For this purpose, the guided vehicle 3 has by way of example a system 10, also described here. The system 10 has a control unit 9, also described here, and a sensor device 6, which can be connected or is connected to the control unit 9 for data transmission. The control unit 9 is designed for carrying out the method described.

The guided vehicle 3 has a front superstructure 15 and a loading platform 16. The front superstructure 15 has toward the loading platform 16 a substantially vertical rear wall 18. In the region in which the loading platform 16 adjoins the rear wall 18 or ends at it, by way of example a loading platform sensor 12 of the guided vehicle 3 is arranged. This region generally lies at the front end of the loading platform 16. The loading platform sensor 12 usually serves for detecting the correct mounting of the product carrier 2 on the loading platform 16. The mounting of the product carrier 2 is correct in particular when the product carrier 2 is arranged sufficiently close to the rear wall 18. The loading platform sensor 12 may be for example an inductive sensor. Furthermore, the loading platform sensor 12 may be aligned upwardly.

Furthermore, the guided vehicle 3 has here by way of example in the region of the rear end of the loading platform 16 the sensor device 6. The sensor device 6 is generally designed for the purpose of monitoring at least one warning zone 8 and/or at least one protective zone 14 in the surrounding area of the guided vehicle 3, in particular behind the guided vehicle 3, or at least scanning it for this purpose, for example by means of laser beams. The actual monitoring may then be carried out by way of example by the control unit 9 or a comparable device of the guided vehicle 3. The sensor device 6 may consequently (also) represent a safety sensor 17 of the guided vehicle 3. The sensor device 6 may preferably be configured as a laser scanner 11 or comprise such a laser scanner. The sensor device 6 is generally aligned predominantly toward the rear or toward the rear and to the sides (to the left side and right side of the guided vehicle 3). It may in this case be provided that the sensor device 6 is not aligned upwardly. Furthermore, it can be seen in FIG. 3 that the guided vehicle 3 is configured here by way of example without a rear loading platform sensor (cf. in FIG. 1: loading platform sensor 13), since it is advantageously possible to dispense with this because of the method that is described here and can be carried out with the guided vehicle 3 according to FIG. 3.

The control unit 9 comprises here by way of example a robot control module 19 (Robot Control Unit; RCU for short), a motion control module 20 (Motion Control Unit, MCU for short) and a safety control module 21 (Safety Control Unit, SCU for short). Here by way of example, the robot control module 19 passes the desired driving direction and the velocity to the motion control module 20. Here by way of example, the motion control module 20 passes on the desired driving direction to the safety control module 21, calculates the setpoint speeds and passes them to a motor device 22 of the guided vehicle 3. The motor device 22 may have one or more (electric) motors, which are operatively connected, possibly by way of a gear mechanism or directly, to driven wheels 23 of the guided vehicle 3, possibly in the sense of individually driven wheels 23.

Furthermore, the guided vehicle 3 may have one or more rotary encoders 24 (for example SIL2 rotary encoders), which transmit the actual speeds of the motors 22 or wheels 23 to the safety control module 21. Here, the safety control module 21 may for example calculate the distance traveled or the distance 7 covered (safe wheel odometry) from the actual speeds and/or switch the corresponding at least one warning zone 8 and/or at least one protective zone 14 (laser scanner zone), in particular in dependence on the desired driving direction.

For carrying out the method, the control unit 9 may for example be designed for the following procedure: while a product carrier 2 is being approached (cf. FIG. 4), the safety control module 21 switches two warning zones 8 and a protective zone 14, which are monitored by means of the sensor device 6 (here by way of example laser scanner 11). In this case, the two warning zones 8 are switched behind the protective zone 14 and with such a (predefinable) lateral distance from one another that they can simultaneously sense two front wheels 25 of the product carrier 2 (with in each case (only) one of the front wheels 25 in one of the warning zones 8). The approaching operation is consequently continued until the safety control module 21 detects that the two warning zones 8 are triggered (dolly detection). The position thereby reached is also referred to here as the initial position 5 (cf. FIG. 5). This represents an example of the situation that, and possibly how according to step a), driving to an initial position 5 predefined in relation to the product carrier 2 can take place, the reaching of the initial position 5 being detected by means of a sensor device 6 of the guided vehicle 3.

Figure 6:
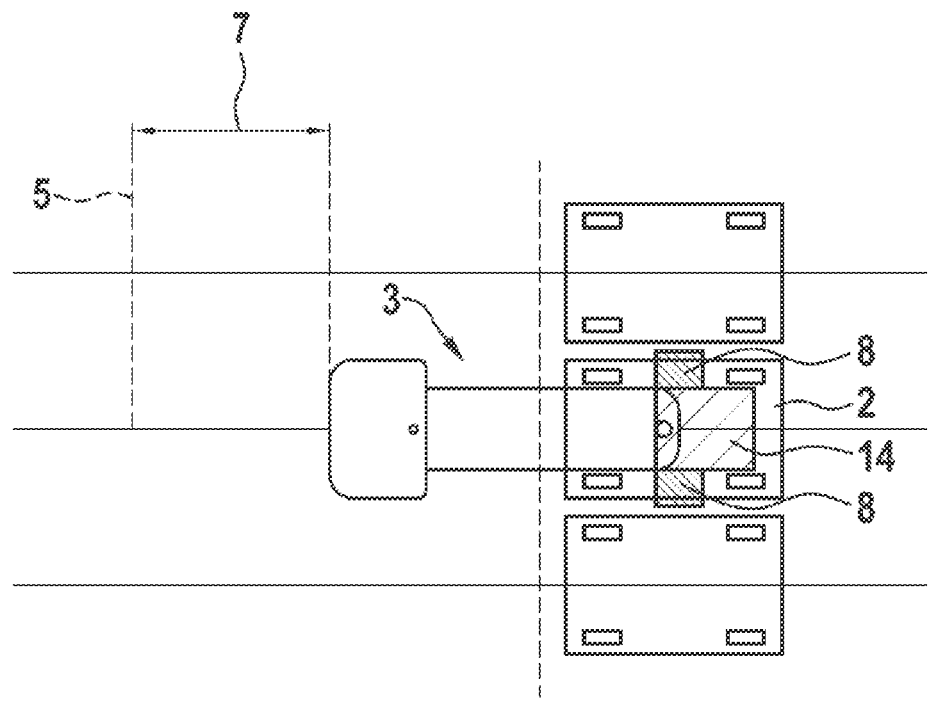

After that, the safety control module 21 may switch over the sensor device 6 to a narrower protective zone 14, while possibly the (longitudinal) position of the warning zones 8 may move toward the guided vehicle 3 (cf. FIG. 6). With this configuration, the loading operation can be continued in the longitudinal direction of the product carrier 2 in order to drive a predefined distance 7, starting from the initial position 5. This represents an example of the situation that, and possibly how according to step b), driving the predefined distance 7 along the direction of extent 4, starting from the initial position 5, can take place.

Once the distance 7 has been covered, the safety control module 21 may once again evaluate the momentary or then current sensing of the sensor device 6 within the two warning zones 8. This represents an example of the situation that, and possibly how according to step c), carrying out a further detection operation by means of the same sensor device 6 of the guided vehicle 3 can take place once the predefined distance 7 has been driven. If in this state no sensing is detected in the warning zones 8 or at least no sensing of further wheels, in particular rear wheels 26, of the product carrier 2 is detected, it can consequently be concluded that a longer product carrier 2 (here a 600 dolly) has been loaded. If in this state sensing is detected in the warning zones 8, in particular sensing of further wheels, in particular rear wheels 26, of the product carrier 2, it can consequently be concluded that a shorter product carrier 2 (here a 400 dolly) has been loaded. Consequently, in the course of the loading operation, the states of the two warning zones 8 can be advantageously used for differentiating between different product carriers 2, in particular between 400 and 600 dollies.

FIGS. 4 to 7 show by way of example and schematically an advantageous use of the method described here in plan view. In this case, a sequence of a loading situation that is possible with the method, for example in a supermarket, is shown by way of example. This also represents an example of the situation that, and possibly how, steps a) to c) can be carried out while loading the product carrier 2 onto the guided vehicle 3.

In FIGS. 4 and 5, it is shown that the guided vehicle 2 with the sensor device 6 (rearwardly directed laser scanner 11) can scan or monitor the region located behind it when driving into a supermarket. In this case, two warning zones 8 can detect independently of one another the respectively left and right (front) wheel 25 (or wheel 25 of the front axle) of the product carrier 2 to be received (here by way of example a floor roller or dolly). This consequently also describes an example of the situation that, and possibly how, the sensor device 6 may monitor at least one warning zone 8, here in particular two warning zones 8, in the area surrounding the guided vehicle 3. By way of example, here the sensor device 6 may scan the warning zones 8 by means of laser beams.

Figure 7:
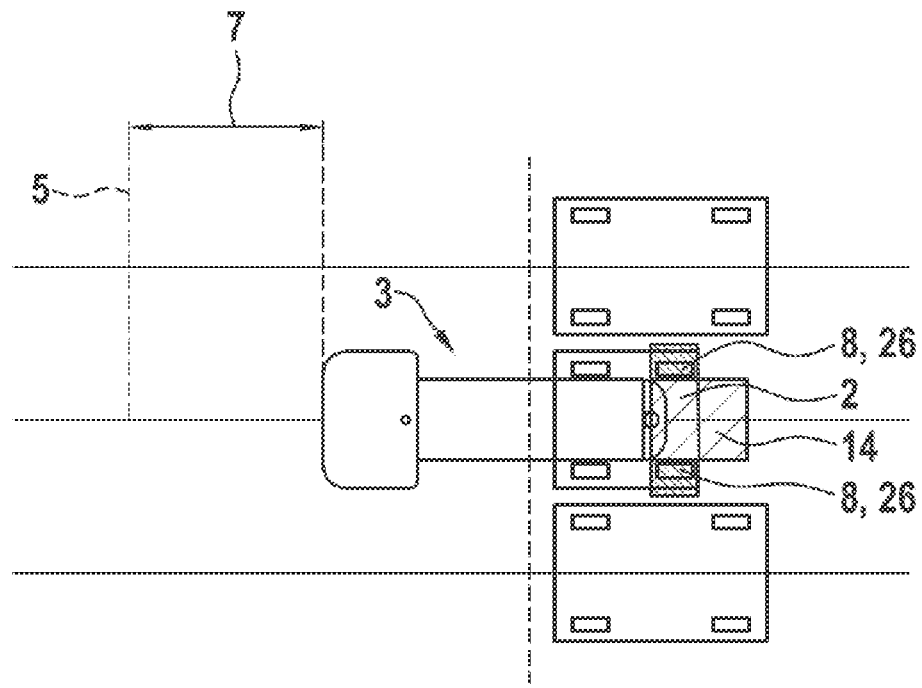

In FIGS. 6 and 7 it is shown that, after successful detection of the front wheels 25, the laser scanner 11 can be switched over to a narrower protective zone 14 and consequently the predefined distance 7 can be driven, which by way of example is suitable here in particular for differentiating between a 600 dolly (FIG. 6: the warning zones 8 are clear) and a 400 dolly (FIG. 7: the warning zones 8 detect the rear wheels 26 or wheels 26 of the second dolly axle). At this moment, the safety control module 21 can (once again) inquire the states of the warning zones 8 of the laser scanner 11 and preferably store them as information for the further loading and unloading operations.

FIGS. 4 to 7 consequently also illustrate a use of a laser scanner 11 attached to the rear side of a guided vehicle 3 that can be operated in an at least partially automated manner for the automated sensing of information concerning the extent 1 of a product carrier 2, which is to be transported by means of the guided vehicle 3, in at least one direction of extent 4.

Consequently specified are a method, a computer program, a machine-readable storage medium, a control unit, a system, a guided vehicle and also a use which at least partially overcome the disadvantages or solve the problems described in connection with the prior art. In particular, in the case of a guided vehicle that can be operated in an at least partially automated manner, which is intended in particular also to be suitable for mixed operation, the number of sensors used is to be reduced (in particular by eliminating the second or rear (inductive) loading platform sensor) while nevertheless providing the highest possible operational safety.

LIST OF REFERENCE SIGNS

1 Extent
2 Product carrier
3 Guided vehicle
4 Direction of extent
5 Initial position
6 Sensor device
7 Distance
8 Warning zone
9 Control unit
10 System
11 Laser scanner
12 Loading platform sensor
13 Loading platform sensor
14 Protective zone
15 Front superstructure
16 Loading platform
17 Safety sensor
18 Rear wall
19 Robot control module
20 Motion control module
21 Safety control module
22 Motor device 23 Wheel
34 Rotary encoder
25 Front wheel
26 Rear wheel

What is claimed is:

1. A method for sensing information concerning an extent of a plurality of product carriers in a direction of extent, the plurality of product carriers configured to be transported by a guided vehicle that is operated in an at least partially automated manner, the method comprising:
    driving, in an automated manner with the guided vehicle, to an initial position that is predefined in relation to the plurality of product carriers;
    detecting with a sensor device of the guided vehicle that the initial position is reached with respect to a first of the plurality of product carriers;
    driving, in an automated manner with the guided vehicle, a predefined distance along the direction of extent, starting from the detected initial position;
    performing, in an automated manner with the guided vehicle, a further detection operation using the sensor device of the guided vehicle once the predefined distance has been driven; and
    determining, based upon not detecting a component associated with the first of the plurality of product carriers by the sensor device in the further detection operation, that the first of the plurality of product carriers is a product carrier of a first type.

2. The method according to claim 1, wherein the driving to the initial position, the driving the predefined distance, and the performing the further detection operation are carried out during a loading of the first of the plurality of product carriers onto the guided vehicle.

3. The method according to claim 1 further comprising:
    monitoring at least one warning zone in a surrounding area of the guided vehicle using of the sensor device.

4. The method according to claim 3, the monitoring further comprising:
    scanning, with the sensor device, the at least one warning zone using laser beams.

5. The method according to claim 1, wherein the method is carried out using a computer program.

6. The method according to claim 5, wherein the computer program is stored on a non-transitory machine-readable storage medium.

7. The method according to claim 1, wherein the method is carried out by a controller of the guided vehicle.

8. A system for a guided vehicle that is operated in an at least partially automated manner, for sensing information concerning an extent of a product carrier in a direction of extent, the product carrier configured to be transported by the guided vehicle, the system comprising:
    a sensor device; and
    a controller connected to the sensor device and configured to receive data from the sensor device, the controller configured to
        drive the guided vehicle, in an automated manner, to an initial position that is predefined in relation to the product carrier,
        detect with the sensor device that the initial position is reached,
        drive the guided vehicle, in an automated manner, a predefined distance along the direction of extent, starting from the initial detected position,
        perform, in an automated manner, a further detection operation using the sensor device of the guided vehicle once the predefined distance has been driven, and
        determine, based upon not detecting a component associated with the product carrier by the sensor device in the further detection operation, that the product carrier is a product carrier of a first type.

9. A guided vehicle that is operated in an at least partially automated manner, the guided vehicle comprising:
    a system configured to sense information concerning an extent of a product carrier in at least one direction of extent, the product carrier being configured to be transported by the guided vehicle, the system including:
        a sensor device; and
        a controller connected to the sensor device and configured to receive data from the sensor device, the controller being configured to
            drive the guided vehicle, in an automated manner, to an initial position that is predefined in relation to the product carrier,
            detect with the sensor that the initial position is reached,
            drive the guided vehicle, in an automated manner, a predefined distance along the direction of extent, starting from the initial detected position,
            perform, in an automated manner, a further detection operation using the sensor device of the guided vehicle once the predefined distance has been driven, and
            determine, based upon not detecting a component associated with the product carrier by the sensor device in the further detection operation, that the product carrier is a product carrier of a first type.

10. The method according to claim 1, where the sensor device is a laser scanner attached to a rear side of the guided vehicle.

11. The method of claim 1, further comprising:
    further detecting with the sensor device of the guided vehicle that the initial position is reached with respect to a second of the plurality of product carriers;
    driving, in an automated manner with the guided vehicle, the predefined distance along the direction of extent, starting from the further detected initial position;
    performing, in an automated manner with the guided vehicle, a second further detection operation using the sensor device of the guided vehicle once the predefined distance has been driven from the further detected initial position; and
    determining, based upon a detection of a component associated with the second of the plurality of product carriers by the sensor device in the further detection operation, that the second of the plurality of product carriers is a product carrier of a second type, wherein the first type of product carrier is longer than the second type of product carrier.

* * * * *